US012548680B1

(12) United States Patent
Shi et al.

(10) Patent No.: US 12,548,680 B1
(45) Date of Patent: Feb. 10, 2026

(54) SYSTEM AND METHOD FOR GENERATING HIGH-FIDELITY PRIVACY-CONSCIOUS SYNTHETIC PATIENT DATA FOR CAUSAL EFFECT ESTIMATION WITH MULTIPLE TREATMENTS

(71) Applicant: Elevance Health, Inc., Indianapolis, IN (US)

(72) Inventors: Jingpu Shi, Pearland, TX (US); Dong Wang, Indianapolis, IN (US); Gino Tesei, Indianapolis, IN (US); Beau Norgeot, Indianapolis, IN (US)

(73) Assignee: Elevance Health, Inc., Indianapolis, IN (US)

( * ) Notice: Subject to any disclaimer, the term of this patent is extended or adjusted under 35 U.S.C. 154(b) by 122 days.

(21) Appl. No.: 18/477,157

(22) Filed: Sep. 28, 2023

Related U.S. Application Data

(60) Provisional application No. 63/377,499, filed on Sep. 28, 2022.

(51) Int. Cl.
*G16H 50/70* (2018.01)
*G06N 3/0475* (2023.01)
(Continued)

(52) U.S. Cl.
CPC .......... *G16H 50/70* (2018.01); *G06N 3/0475* (2023.01); *G06N 3/094* (2023.01); *G16H 50/20* (2018.01); *G16H 50/50* (2018.01)

(58) Field of Classification Search
CPC ........ G16H 50/70; G16H 50/20; G16H 50/50; G06N 3/0475; G06N 3/094
See application file for complete search history.

(56) References Cited

U.S. PATENT DOCUMENTS

| 2022/0180447 | A1* | 6/2022 | Kearney | G06N 3/047 |
| 2023/0281427 | A1* | 9/2023 | Sakhinana | G06N 3/094 |
| | | | | 706/15 |
| 2023/0281428 | A1* | 9/2023 | Sakhinana | G06N 3/088 |
| | | | | 706/21 |

FOREIGN PATENT DOCUMENTS

| CN | 114787826 A | * | 7/2022 | ......... G06F 21/6254 |
| JP | 2021530792 A | * | 11/2021 | |

OTHER PUBLICATIONS

Yoon et al., "Anonymization Through Data Synthesis Using Generative Adversarial Networks (ADS-GAN)," IEEE Journal of Biomedical and Health Informatics, vol. 24, No. 8, Aug. 2020; Digital Object Identifier 10.1109/JBHI.2020.2980262 (Year: 2020).*

(Continued)

*Primary Examiner* — Jonathon A. Szumny
(74) *Attorney, Agent, or Firm* — Morgan, Lewis & Bockius LLP

(57) ABSTRACT

The present disclosure shows a generated, large-scale and realistic patient dataset that mimics real patient data distributions, supports multiple treatments, and provides ground truth for the effects of these treatments. The datasets generated are of synthetic patients modeled on a large nationwide cohort of real patient data including their history of diagnoses, medications, and laboratory values. A data generation process is designed by adapting an Anonymization Through Data Synthesis Using Generative Adversarial Networks (ADS-GAN) model for fictitious patient information generation and using a neural network for treatment outcome generation. The synthetic dataset demonstrates strong similarity to the original dataset as measured by the Wasserstein distance. In addition, privacy of the original patients is preserved so that the dataset can be made available to the research community to evaluate causal inference models.

8 Claims, 8 Drawing Sheets

(51) Int. Cl.
    G06N 3/094    (2023.01)
    G16H 50/20    (2018.01)
    G16H 50/50    (2018.01)

(56) References Cited

OTHER PUBLICATIONS

Munia et al., "Biosignal Oversampling Using Wasserstein Generative Adversarial Network," 2020 IEEE International Conference on Healthcare Informatics (ICHI) | DOI: 10.1109/ICHI48887.2020.9374315/ (Year: 2020).*

Yahi et al., "Generative Adversarial Networks for Electronic Health Records: A Framework for Exploring and Evaluating Methods for Predicting Drug-Induced Laboratory Test Trajectories," 31st Conference on Neural Information Processing Systems (NIPS 2017), Long Beach, CA, USA; arXiv:1712.00164v1. (Year: 2017).*

Shi et al., "Generating high-fidelity privacy-conscious synthetic patient data for causal effect estimation with multiple treatments," Front. Artif. Intell. 5:918813; doi: 10.3389/frai.2022.918813. (Year: 2022).*

* cited by examiner

600

```
┌─────────────────────────────────────────────────────────────┐
│ Create a filtered real patient dataset by removing, from    │
│ the real patient dataset, data relating to patients having  │
│ at least one of a disqualifying demographic condition, a    │
│ disqualifying medical condition, and a disqualifying        │
│ treatment                                                    │
│ 602                                                          │
└─────────────────────────────────────────────────────────────┘
                              │
                              ▼
┌─────────────────────────────────────────────────────────────┐
│ Filter the real patient dataset to include only patients    │
│ having received one of a plurality of identified treatments │
│ for the condition                                            │
│ 604                                                          │
└─────────────────────────────────────────────────────────────┘
                              │
                              ▼
┌─────────────────────────────────────────────────────────────┐
│ Create a standardized real patient dataset by capturing     │
│ trajectory data representing the filtered real patient      │
│ dataset                                                      │
│ 606                                                          │
└─────────────────────────────────────────────────────────────┘
                              │
                              ▼
┌─────────────────────────────────────────────────────────────┐
│ converting the trajectory data to tabular data, the tabular │
│ data comprising samples relating to patients, and variables │
│ relating to patient features                                 │
│ 608                                                          │
└─────────────────────────────────────────────────────────────┘
                              │
                              ▼
┌─────────────────────────────────────────────────────────────┐
│ Standardize the variables into numerical values             │
│ 610                                                          │
└─────────────────────────────────────────────────────────────┘
                              │
                              ▼
┌─────────────────────────────────────────────────────────────┐
│ Generate the synthetic patient dataset, using a generator,  │
│ by creating a cartesian product of a patient feature space  │
│ of the standardized real patient dataset, and a random      │
│ variable space, and mapping the cartesian product to the    │
│ patient feature space                                        │
│ 612                                                          │
└─────────────────────────────────────────────────────────────┘
                              │
                              ▼
┌─────────────────────────────────────────────────────────────┐
│ Measure a distance between a distribution of the synthetic  │
│ patient dataset and a distribution of the patients in the   │
│ standardized real patient dataset, using a discriminator,   │
│ by mapping the patient feature space to a set of real       │
│ numbers, wherein the generator and the discriminator are    │
│ trained in an adversarial fashion                            │
│ 614                                                          │
└─────────────────────────────────────────────────────────────┘
                              │
                              ▼
                        ( FIG. 6B )
```

FIG. 6A

SYSTEM AND METHOD FOR GENERATING HIGH-FIDELITY PRIVACY-CONSCIOUS SYNTHETIC PATIENT DATA FOR CAUSAL EFFECT ESTIMATION WITH MULTIPLE TREATMENTS

CROSS REFERENCE TO RELATED APPLICATIONS

This application claims the benefit of U.S. Provisional Patent Application No. 63/377,499, filed Sep. 28, 2022, the entirety of which is incorporated by reference herein.

BACKGROUND

In the past decade, there has been exponentially growing interest in the use of observational data collected as a part of routine healthcare practice to determine the effect of a treatment with causal inference models. Validation of these models, however, has been a challenge because the ground truth is unknown, only one treatment-outcome pair for each person can be observed. There have been multiple efforts to fill this void using synthetic data where the ground truth can be generated. However, to date, these datasets have been severely limited in their utility either by being modeled after small non-representative patient populations, being dissimilar to real target populations, or only providing known effects for two cohorts (treated vs. control).

SUMMARY

In the present disclosure, a large-scale and realistic synthetic dataset has been produced, which provides ground truth effects for over 10 hypertension treatments on blood pressure outcomes. The synthetic dataset may be created by modeling a nationwide cohort of more than 580,000 hypertension patient data including each person's multi-year history of diagnoses, medications, and laboratory values. A data generation process is designed by combining an adapted ADS-GAN model for fictitious patient information generation and a neural network for treatment outcome generation. Wasserstein distance of 0.35 demonstrates that the synthetic data of the present disclosure follows a nearly identical joint distribution to the patient cohort used to generate the data.

Patient privacy is a primary concern. The E-identifiability metric of the synthetic data set of the present disclosure, which estimates the probability of actual patients being identified, is 0.008%, which demonstrates that the synthetic data cannot be used to identify any actual patients whose medical records may have been used to create the synthetic dataset. To demonstrate its usage, bias may be tested in causal effect estimation of four well-established models using this dataset. The approach can be readily extended to other types of diseases in the clinical domain, and to datasets in other domains as well.

In health care, studying the causal treatment effects on patients is critical to advance personalized medicine. Observing an association between a drug (exposure or treatment) and subsequent adverse or beneficial event (outcome) is not enough to claim that the treatment (or exposure) has a significant effect on the observed outcome. This is because of the existence of confounding variables, defined as factors that affect both the treatments and outcomes. Randomized controlled trials (RCTs) have been the gold standard for estimating causal relationships between intervention and outcome. However, RCTs are sometimes not feasible due to logistical, ethical, or financial considerations. Further, randomized experiments may not always be generalizable, due to the restricted population used in the experiments. In the past decade, observational data has become a viable alternative to RCTs to infer causal treatment effects due to both the increasingly available patient data captured in Electronic Health Records (EHRs) and the remarkable advances of machine learning techniques and capabilities. Typically, EHRs capture potential confounding factors such as race, gender, geographic location, eventual proxies of social determinants of health, as well as medical characteristics such as comorbidities and laboratory results.

Many causal inference models have been proposed to estimate treatment effects from observational data. Validation of these models with realistic benchmarks, however, remains a fundamental challenge due to three reasons. First, the ground truth of treatment effects in a realistic setting is unknown. In real world, a treatment effect cannot be computed by directly comparing the potential outcomes of different treatments because of the fundamental problem of causal inference: for a given patient and treatment, only the factual, defined as the patient outcome for the given treatment can be observed. The counterfactual, defined as the patient outcome if the treatment had been different, cannot be observed. Legal and ethical issues around un-consented patient data and privacy also created a significant barrier in accessing EHRs by the machine learning community. In order to mitigate the legal and ethical risks of sharing sensitive information, de-identification of patient records is a commonly used practice. However, previous attempts at de-identification have not been sufficient for avoiding re-identification through linkage with other identifiable datasets. Also, most publicly available datasets support binary treatments, while there has been growing literature developing techniques with multiple treatments in recent years.

To address these challenges, the present disclosure shows a generated, large-scale and realistic patient dataset that mimics real patient data distributions, supports multiple treatments, and provides ground truth for the effects of these treatments. The datasets generated are of synthetic patients with hypertension modeled on a large nationwide cohort of real patient data including their history of diagnoses, medications, and laboratory values. A data generation process is designed by adapting an Anonymization Through Data Synthesis Using Generative Adversarial Networks (ADS-GAN) model for fictitious patient information generation and using a neural network for treatment outcome generation. The synthetic dataset demonstrates strong similarity to the original dataset as measured by the Wasserstein distance. In addition, privacy of the original patients is preserved so that the dataset can be made available to the research community to evaluate causal inference models.

The use of the synthetic data may be demonstrated by applying the dataset to evaluate four models: the inverse probability treatment weighting (IPTW) model, the propensity matching model, the propensity score stratification model, and one model in the doubly robust family.

The dataset disclosed herein is the first large scale clinical dataset that mimics real data joint distributions with multiple treatments and known causal effects. Since hypertension is a condition affecting nearly half of adults in the United States (116 million, or 47%), the generated dataset disclosed herein can be directly used for clinical researchers to develop and evaluate their models for this important disease. The approach can be readily extended to other types of diseases in the clinical domain, and to datasets in other domains as well.

In some embodiments described here, a method of generating a synthetic patient dataset for use in causal effect evaluation of a treatment for a condition, from a real patient dataset comprising data relating to real patients who have been diagnosed with the condition, in accordance with one aspect of the precent disclosure is disclosed. The method may include the steps of creating a filtered real patient dataset by removing, from the real patient dataset, data relating to patients having at least one of a disqualifying demographic condition, a disqualifying medical condition, and a disqualifying treatment, and filtering the real patient dataset to include only patients having received one of a plurality of identified treatments for the condition. The method may also include the steps of creating a standardized real patient dataset by capturing trajectory data representing the filtered real patient dataset, converting the trajectory data to tabular data, the tabular data comprising samples relating to patients, and variables relating to patient features, and standardizing the variables into numerical values.

The method may also include generating the synthetic patient dataset, using a generator, by creating a cartesian product of a patient feature space of the standardized real patient dataset, and a random variable space, and mapping the cartesian product to the patient feature space, measuring a distance between a distribution of the synthetic patient dataset and a distribution of the patients in the standardized real patient dataset, using a discriminator, by mapping the patient feature space to a set of real numbers, wherein the generator and the discriminator are trained in an adversarial fashion.

The method may also include applying an identifiability function to ensure that the synthetic patient dataset is substantially different from the standardized real patient dataset, wherein the identifiability function includes a weight calculated as an inverse of a discrete entropy of each patient feature, and wherein the weight of a patient feature has a direct correlation to a rarity of the patient feature.

The method may also include applying a loss function to ensure that the distribution of the synthetic patient dataset is indistinguishable from the distribution of the patients in the standardized real patient dataset, wherein the loss function uses a Wasserstein distance between the distribution of the patients in the synthetic patient dataset and the distribution of the patients in the standardized real patient dataset, wherein the loss function includes a contrastive loss term, and wherein the loss function imposes a penalty when a sample of a datapoint in the standardized real patient database, as generated by the generator, is closer to a randomly drawn sample from the standardized real patient dataset than to the datapoint.

The method may also include training a neural network model on the standardized real patient dataset to capture treatment effects with network weights and a mapping from patient covariates to outcomes, and inputting the mapping, the treatment effects, and synthetic covariates to the neural network model to produce synthetic outcomes that resemble real outcomes.

In some embodiments, each patient in the synthetic data set is associated with a treatment received by the patient. In some embodiments, the method may also include the steps of feeding the synthetic data set into the neural network; and using the neural network, generating, for each patient in the synthetic data set, a factual treatment outcome relating to the treatment, and a counterfactual treatment outcome representing an outcome of not having received the treatment.

In some embodiments, the variables relate to measured vital statistics, treatments, basic patient information, laboratory measurements, and patient conditions. In some embodiments, a variable relating to treatments includes a date of treatment, wherein a variable relating to vital statistics includes a date of measurement, and wherein the dataset includes at least one vital statistic measured before the date of treatment, and at least one vital statistic measured after the date of treatment. In some embodiments, a variable relating to treatments includes a date of treatment, a variable relating to laboratory measurement includes a date of measurement, and the dataset includes at least one laboratory measurement measured before the date of treatment, and at least one laboratory measurement measured after the date of treatment.

In some embodiments, standardizing the variables into numerical values may also include transforming the variables into numerical values in the [0,1] range. In some embodiments, the synthetic outcomes include counterfactual outcomes resulting from an absence of a treatment.

BRIEF DESCRIPTION OF THE DRAWINGS

FIGS. 6A and 6B are flow charts of a method in accordance with some aspects of the present disclosure.

DETAILED DESCRIPTION

Aspects of the present disclosure include systems and methods for (1) the creation of realistic patient data that cannot be used to trace back to any real patients and/or (2) determining a ground truth for treatment effects so that synthetic data can be used to evaluate causal inference models in a realistic setting. In some embodiments, the systems and/or methods of the present disclosure allow for the generation of the realistic synthetic data while simultaneously preserving patient privacy. In some embodiments, the systems and/or methods of the present disclosure provide ground truth for treatment effects regardless of any fundamental problem of cause inference. For example, for a given patient and treatment, only the factual (the patient outcome for the given treatment) can be observed, however, the counterfactual (defined as the patient outcome if the treatment had been different) cannot.

The present disclosure provides systems and methods for generation of a large-scale and realistic synthetic dataset that provides ground truth effects for at least 10 hypertension treatments on blood pressure outcomes. The synthetic dataset described herein may be generated by modeling a nationwide cohort of more than 580,000 hypertension patient datasets including each data relating to each patient's multi-year history of diagnoses, medications, and/or laboratory values. The data generation process for generating the synthetic dataset may include combining an adapted ADS-GAN model for fictitious patient information generation with a neural network for treatment outcome generation.

Figure 1:
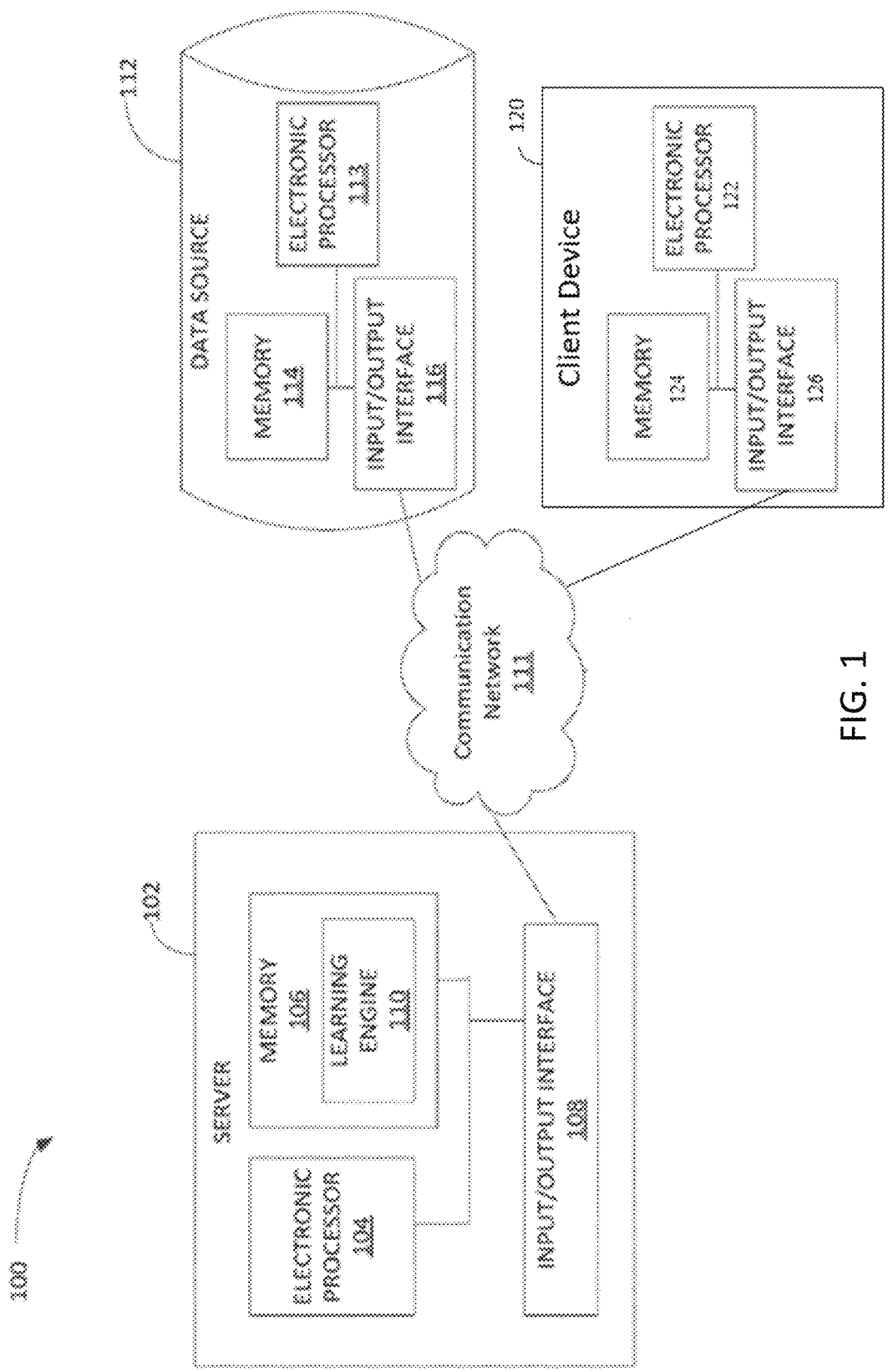
FIG. 1 is a block diagram of a system that may be used to implement aspects of the present disclosure.

FIG. 1 illustrates a system 100 for creating, running, and serving patient datasets, enhanced by artificial intelligence, according to some embodiments of the invention. The system 100 includes a server 102 that includes a plurality of electrical and electronic components that provide power, operational control, and protection of the components within the server 102. For example, as illustrated in FIG. 1, the server 102 may include an electronic processor 104 (e.g., a microprocessor, application-specific integrated circuit (ASIC), or another suitable electronic device), a memory 106 (e.g., a non-transitory, computer-readable storage medium), and an input/output interface 108. The electronic processor 104, the memory 106, and the input/output interface 108 communicate over one or more connections or buses. The server 102 illustrated in FIG. 1 represents one example of a server, and embodiments described herein may include a server with additional, fewer, or different components than the server 102 illustrated in FIG. 1. Also, in some embodiments, the server 102 performs functionality in addition to the functionality described herein. Similarly, the functionality performed by the server 102 (i.e., through execution of instructions by the electronic processor 104) may be distributed among multiple servers. Accordingly, functionality described herein as being performed by the electronic processor 104 may be performed by one or more electronic processors included in the server 102, external to the server 102, or a combination thereof.

The memory 106 may include read-only memory ("ROM"), random access memory ("RAM") (e.g., dynamic RAM ("DRAM"), synchronous DRAM ("SDRAM"), and the like), electrically erasable programmable read-only memory ("EEPROM"), flash memory, a hard disk, a secure digital ("SD") card, other suitable memory devices, or a combination thereof, which may include transitory memory, non-transitory memory, or both. The electronic processor 104 executes computer-readable instructions ("software") stored in the memory 106. The software may include firmware, one or more applications, program data, filters, rules, one or more program modules, and other executable instructions. For example, the software may include instructions and associated data for performing the methods described herein. For example, as illustrated in FIG. 1, the memory 106 may store an artificial intelligence software module (e.g., "software") 110 for performing one or more of the functions described herein, which may include natural language processing, fuzzy logic, answer generation, keyword extraction, prompt engineering, intent recognition, machine learning, artificial intelligence, text summarization, or the like. However, in other embodiments, the functionality described herein as being performed by the chatbot module 110 may be performed through one or more software modules stored in the memory 106 or external memory.

The input/output interface 108 allows the server 102 to communicate with devices external to the server 102. For example, as illustrated in FIG. 1, the server 102 may communicate with one or more data sources 112 through the input/output interface 108. In particular, the input/output interface 108 may include a port for receiving a wired connection to an external device (e.g., a universal serial bus ("USB") cable and the like), a transceiver for establishing a wireless connection to an external device (e.g., over one or more communication networks 111, such as the Internet, a local area network ("LAN"), a wide area network ("WAN"), and the like), or a combination thereof.

In some embodiments, the server 102 also receives input from one or more peripheral devices, such as a keyboard, a pointing device (e.g., a mouse), buttons on a touch screen, a scroll ball, mechanical buttons, and the like through the input/output interface 108. Similarly, in some embodiments, the server 102 provides output to one or more peripheral devices, such as a display device (e.g., a liquid crystal display ("LCD"), a touch screen, and the like), a printer, a speaker, and the like through the input/output interface 108. In some embodiments, output may be provided within a graphical user interface ("GUI") (e.g., generated by the electronic processor 104 executing instructions and data stored in the memory 106 and presented on a touch screen or other display) that enables a user to interact with the server 102. In other embodiments, a user may interact with the server 102 through one or more intermediary devices, such as a personal computing device, e.g., laptop, desktop, tablet, smartphone, smartwatch or other wearable device, smart television, and the like. For example, a user may configure functionality performed by the server 102 as described herein by providing data to an intermediary device that communicates with the server 102. In particular, a user may use a browser application executed by an intermediary device to access a web page that receives input from and provides output to the user for configuring the functionality performed by the server 102.

As illustrated in FIG. 1, the system 100 includes one or more data sources 112. Each data source 112 may include a plurality of electrical and electronic components that provide power, operational control, and protection of the components within the data source 112. In some embodiments, each data source 112 represents a server, a database, a personal computing device, or a combination thereof. For example, as illustrated in FIG. 1, each data source 112 may include an electronic processor 113 (e.g., a microprocessor, ASIC, or other suitable electronic device), a memory 114 (e.g., a non-transitory, computer-readable storage medium), and an input/output interface 116. The data sources 112 illustrated in FIG. 1 represent one example of data sources and embodiments described herein and may include a data source with additional, fewer, or different components than the data sources 112 illustrated in FIG. 1. Also, in some embodiments, the server 102 communicates with more or fewer data sources 112 than illustrated in FIG. 1. Data source 112 may include a storage layer, e.g. storage layer 208 as discussed in more detail below with reference to FIG. 2.

The input/output interface 116 allows the data source 112 to communicate with external devices, such as the server 102. For example, as illustrated in FIG. 1, the input/output interface 116 may include a transceiver for establishing a wireless connection to the server 102 or other devices through the communication network 111 described above. Alternatively or in addition, the input/output interface 116 may include a port for receiving a wired connection to the server 102 or other devices. Furthermore, in some embodiments, the data sources 112 also communicate with one or more peripheral devices through the input/output interface 116 for receiving input from a user, providing output to a user, or a combination thereof. In other embodiments, one or more of the data sources 112 may communicate with the server 102 through one or more intermediary devices. Also, in some embodiments, one or more of the data sources 112 may be included in the server 102.

The memory 114 of each data source 112 may store data, such as a real or synthetic patient database and the like. In some embodiments, as noted above, data stored in the data sources 112 or a portion thereof may be stored locally on the server 102 (e.g., in the memory 106).

User device 120 may also be connected to communication network 111, for communication with server 102 and/or with data source 112. Inputs and outputs 118 may flow between server 102, e.g., via input/output interface 108, and user device 120, e.g., via input/output interface 126. Inputs may include chatbot interactions and input test files as described herein below. Outputs may include one or more synthetic patient datasets, as described in more detail below.

Figure 2A:
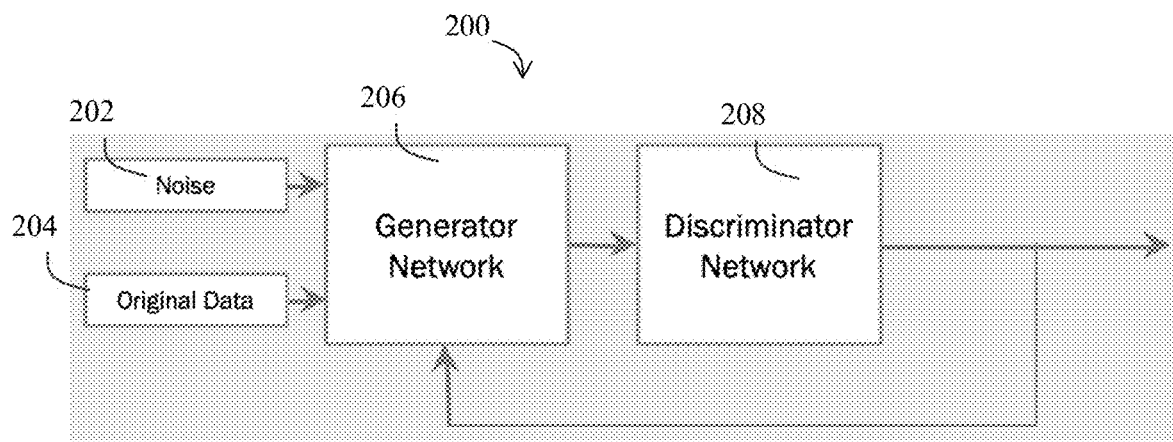
FIG. 2A is a block diagram illustrating a system for the generation of high-fidelity privacy-conscious synthetic patient data in accordance with an exemplary embodiment of the present disclosure.

Referring to FIG. 2A, a system 200 may be configured to generate synthetic patients by using an adapted ADS-GAN model to generate one or more patient variables, from an original data set 202. The system may also receive other data in addition to the original data set, which may include data that is irrelevant to the generation of synthetic patients, and may be referred to as noise 204. In some embodiments, an adapted ADS-GAN model may be an ADS-GAN model adapted by adding thereto one or more contrastive terms to its loss function and used to generate a plurality of patient variables for use in a study. In some embodiments, generator network 206 and/or discriminator network 208 may be implemented by the system, as discussed below, e.g. using multi-layer perceptrons. The one or more constrastive terms may introduce a penalty term to the loss function if one of the key assumptions in the ADS-GAN model is violated.

Figure 2B:
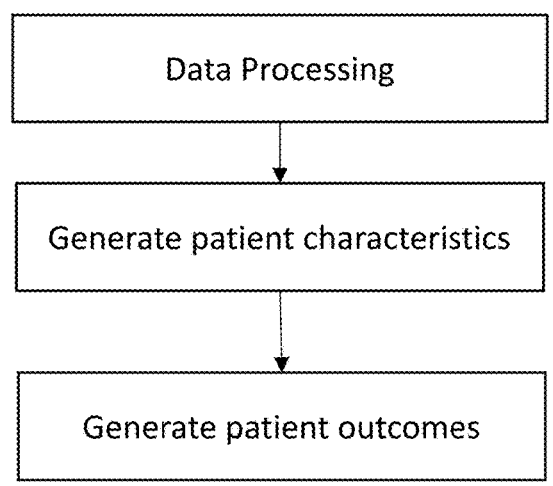
FIG. 2B is a flowchart illustrating a method for the generation of high high-fidelity privacy-conscious synthetic patient data in accordance with an exemplary embodiment of the present disclosure.

Referring to FIG. 2B, there is shown a flowchart 250 illustrating a method for the generation of high high-fidelity privacy-conscious synthetic patient data in accordance with an exemplary embodiment of the present disclosure. In some embodiments, the method may include the step of data preprocessing.

Figure 3:
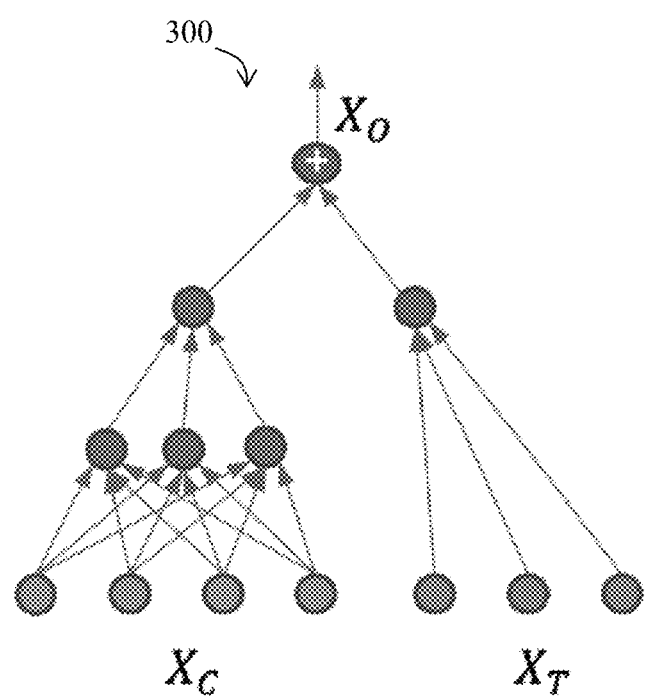
FIG. 3 is a diagram illustrating a neural network for the generation of patient outcomes in accordance with exemplary embodiments of the present disclosure.

Referring to FIG. 3, there is shown a neural network, 300, trained on the real patient dataset, generated by the system of the present disclosure, to capture one or more of the treatment effects with the network weights and the mapping from patient covariates to outcomes. In some embodiments, the neural network illustrated in FIG. 3 is used to capture the treatment effects through training, as disclosed below.

In some embodiments, the learned mapping and treatment effects, along with the synthetic covariates may be used as the neural network's inputs, such that the neural network produces synthetic outcomes that resemble real outcomes. The captured treatment effects may serve as the ground truth in the synthetic data when the data is used to evaluate causal inference models because the patient outcomes are generated from these causal effects.

The step of data preprocessing may include, preprocessing a patient dataset and preparing the patient dataset for subsequent steps. The patient dataset may contain mixed data types including integers (e.g., age), floats (e.g., lab values), categorical values (e.g., drugs), and/or dates. Further, the values and dates of a lab test may be missing for some patients if a corresponding lab test is not ordered by the respective doctors for these patients. The categorical variables may be one-hot encoded and the continuous variables may be standardized such that all the variables are transformed into numerical values in the [0, 1] range. In some embodiments a binary feature may be added to the dataset for each lab test to indicate missing lab values and/or dates.

In some embodiments, the method may include the step of generating patient characteristics.

Generating patient characteristics may include (1) the generation of realistic synthetic data, or at least as realistic as possible, and (2) ensuring that the generated synthetic data is privacy protected such that the probability of identifying any actual patients included in the original dataset from the synthetic dataset is very low or impossible. For example, the system illustrated in FIG. 2A may be used to generate such a synthetic dataset.

In some embodiments, the method may include the step of generating patient outcomes. Generating patient outcomes may include using an artificial neural network (e.g., as shown in FIG. 3) configured to capture the treatment effects from real data and use the captured treatment effects to generate patient outcomes for the synthetic data. In some embodiments, the domain of the observed patient variables may be partitioned into a covariate domain, a treatment domain, and/or an outcome. For the covariate domain, the artificial neural network may be a fully connected feed-forward neural network with rectified linear unit (Relu) as the activation function for all the neurons. For the treatment domain, the artificial neural network inputs may be encoded treatments directly connected to a neuron with a linear activation. The loss function used may be the standard mean square error (MSE). A dropout may be applied to all the layers and L2 regularization is applied to all the weights of the neural network. In some embodiments, the neural network may be first trained on real patient data, then the trained neural network may be used to produce patient outcomes.

The systems and methods of the present disclosure may be configured to generate a large-scale and realistic patient dataset that mimics real patient data distributions, supports multiple treatments, and/or provides ground truth for the effects of these treatments. The neural network illustrated in FIG. 3 may be designed to capture the treatment effects from real patient data and generate patient outcomes in such a way that the ground truth of the treatment effects becomes known. The separation of the covariate domain from the treatment domain may make the calculation of the treatment effects tractable. Adding a contrastive term to the loss function of the ADS-GAN model may make the model more suitable to generate large scale synthetic data. The ADS-GAN model and the artificial neural network may be combined in a sequential and seamless way to produce synthetic outcomes based on patient characteristics that look realistic.

In some embodiments, the data generated may be based on a real-world patient database, such as from, but not limited to, a large insurance company based in the United States. For example, the real-world patient database may contain any number of insurance claims (e.g., 5 billion insurance claims) including, but not limited to diagnoses, procedures, and drug prescriptions or refills. The real-world patient database may also include lab test results from 56.4 million patients who subscribed to the company's service within a 5-year time period between December 2014 and December 2020. From this real-world patient database, a subset of patients affected by hypertension may be extracted to generate an extracted dataset. For example, patients may included in the extracted dataset if they had a medical claim indicating hypertension (ICD code I10, I11.9, I12.9, and I13.10) or treated with anti-hypertensive medications. Synthetic data to be included in a synthetic dataset may be generated using the systems and methods described above with reference to FIGS. 2A and 3 and evaluated to determine the quality of the synthetic data.

The probability of tracing back to any real patient from the synthetic data (identifiability) generated in this manner is extremely low. For example, the joint distribution of the synthetic data looks very similar to that of the real data. As such, the synthetic data generated by the systems and methods of the present disclosure may be used to evaluate other causal inference models.

To illustrate how well the generated synthetic data preserves the joint distribution of the original data, the Wasserstein distance between the joint distribution of the synthetic data and that of the original data may be calculated to be 0.35, which is in the range (0.17, 8.6), where 0.17 is the Wasserstein distance in the best-case scenario and 8.6 is the Wasserstein distance in the baseline scenario. Multiple random splits in the best-case scenario may be performed, and the Wasserstein distance may vary very little with different splits.

The identifiability may be calculated to be 0.008% from the synthetic dataset, and 0.0007% from the random dataset, indicating that the risk of any actual patient being identified from the synthetic dataset is extremely small.

Finally, to demonstrate the usage of the synthetic dataset, the accuracy of causal effect estimate may be evaluated using four well-established models: the doubly robust (DR), the propensity score stratification, the propensity matching, and the inverse probability treatment weighting (IPTW) model. Doubly robust approaches adopt an outcome regression model to estimate the treatment outcome and a propensity model to estimate the probability of a patient being assigned to a treatment.

To estimate how these models perform in a real-world setting, an additional dataset may be generated that consisted of all patient variables of the original dataset and patient outcomes generated from the trained outcome neural network with patient variables and treatments from the original dataset as its inputs. This dataset may be referred to as a hybrid dataset because part of the data comes from the original dataset and part of the data is generated. The four causal inference models may be run on both the synthetic dataset and the hybrid dataset and the results may be compared.

The results on the hybrid dataset show that the evaluated algorithms performed very differently. For example, the doubly robust model produced the best results and captured both the ranking and the magnitude of the drug effects; the propensity stratification and matching model captured the ranking of the drugs but may not be able to correctly calculate the magnitude of the drug effects. The IPTW model may not be able to produce correct results on the ranking, nor on the magnitude. The results on the synthetic dataset show a similar pattern and preserves the relative performance of different models that would be achieved in a more realistic setting, represented by the hybrid dataset.

To make the synthetic data realistic, the data may be generated based on a real-world patient database from a large insurance company in the United States. Aspects of the present disclosure are discussed in this paragraph and those following with reference to specific examples and tests along with measured outcomes. However, it will be understood that the following examples, specific test data, and outcomes are meant to illustrate the inventive concepts discussed herein and are not intended to be limiting. This database contains 5 billion insurance claims (diagnoses, procedures, and drug prescriptions or refills) and lab test results from millions of patients who subscribed to the company's service within a multi-year time period. From this database, a subset of patients affected by hypertension may be extracted. Patients may be included in the dataset if they had a medical claim indicating hypertension (ICD code I10, I11.9, I12.9, and I13.10) or treated with anti-hypertensive medications. Patients may be excluded from the dataset if they are age <18 or age >85, affected by white coat hypertension, secondary hypertension, malignant cancers, dementia, or are pregnant. After applying the above mentioned inclusion and exclusion criteria, a subset of the payments may still be included. Patients treated with a combination of drugs rather than a single drug may then be further excluded. Drugs may be ranked by the number of patients treated with each drug, and only patients who either treated with one of the 10 most popular drugs, or not received any treatments at all, may be included. These filtering steps produced about 580, 000 patients in the study. The distribution of this dataset may then be learned and used to generate synthetic patients, viewed as samples drawn from the learned distribution. Included patients may be included in original data 204 of FIG. 2A, while excluded patients may be included in noise 202 of FIG. 2A.

The patients' diagnoses and treatment history and how their conditions evolve over time may be captured by trajectory data consisting of labs, diagnoses and their corresponding dates. For the convenience of data processing and analysis, the trajectory data may be converted into tabular data with rows representing different patients (samples) and columns representing patient features (variables) including patient demographics, diagnoses, medications and labs. In Table. 1, these 60 patient variables are shown. 2 variables (F1) describing the systolic blood pressure before the treatment and the date it is measured, 2 variables (F2) describing the systolic blood pressure after the treatment and the date it is measured, 3 variables (F3) indicating current and prior drug usage and refill information, 4 variables (F4) describing patient basic information (age, gender, ethnicity), 30 variables (F5) indicating laboratory measurements, 2 variables (F6) indicating the presence or absence of comorbid conditions defined by the Charlson Comorbidity Index, 15 variables (F7) describing the patient's zip code, the racial makeup and income levels in the patient's zip code tabulation area (ZCTA), 2 variables (F8) indicating meta information. The causal effects of anti-hypertensive drugs (current drugs of F3) on patient outcomes may be measured as the difference between the first (F1) and second lab results (F2).

Methods

To generate the synthetic data, first, patient variables may be generated, using an adapted ADS-GAN model. Then, the treatment outcomes may be generated using a neural network, e.g. the neural network of FIG. 3. This approach can be conceptually decomposed into four steps as described below.

Data Preprocessing

The synthetic data may be generated from the patient data extracted as described above. In this step, the data may be preprocessed and prepared for subsequent steps. As described in Table 1, this patient dataset contains mixed data types including integers (e.g., age), floats (e.g., lab values), categorical values (e.g., drugs), and dates.

TABLE 1

Names, grouping, and descriptions of patient variables for hypertension dataset.

| Family var. | Var. Names | Description |
|---|---|---|
| F1 | date–, lab– | First lab result and ate |
| F2 | date–, lab+ | Second lab result and date |
| F3 | drugs, prior_drugs, last_refill | Drugs' info |
| F4 | age, gndr_cd, race_cd, ethncty_cd | Age/Gender/Ethnicity |
| F5 | lab measurement results and date | 11 lab measurements and date |
| F6 | safety_orbs, morbs_prior | Current and previous comorbidities |
| F7 | zip_cd, total pop, p_female, median_income etc. | Zip code and related statistics |
| F8 | trajectory_index, mcid | Meta-information |

Further, the values and dates of a lab test are missing for some patients if the lab test is not ordered by the doctors for these patients. The categorical variables may be one-hot encoded and the continuous variables may be standardized, so that all the variables may be transformed into numerical values in the [0, 1] range. A binary feature may be added for each lab test to indicate missing lab values and dates. The resulting dataset has 200 features available per patient and is referred to herein as the original dataset, to be distinguished from the synthetic dataset. The original dataset may also be referred to as standardized real patient dataset.

Step 2: Generation of Observed Variables Using ADS-GAN

In this step, synthetic patients may be generated, which may be characterized by the same variables as listed in Table 1. This step is designed to achieve two goals: to make the synthetic data as realistic as possible and to make sure the probability of identifying any actual patients in the original dataset from the synthetic dataset is very low. Identifiability is quantitively defined in Definition 2 as discussed below. Realisticity is defined as the Wasserstein distance between the feature joint distribution of the synthetic dataset and that of the real dataset it is modeled after.

There is a trade-off between the identifiability and realisticity of the generated data. Frameworks like the Medical Generative Adversarial Network and Wasserstein Generative Adversarial Network and Gradient Penalty do not explicitly define and allow to control the identifiability levels. Therefore, generative models may be evaluated, that allow to explicitly control such a trade-off, e.g. the ADS-GAN, Private Aggregation of Teacher Ensembles Generative Adversarial Network and Diversity-promoting Generative Adversarial Network. ADS-GAN proved to consistently outperform the others across the entire range of identifiability levels on both the MAGGIC (Meta-Analysis Global Group in Chronic Heart Failure) and the three UNOS (United Network for Organ Sharing) transplant datasets. It is also based on a measurable definition for identifiability. Another advantage of ADS-GAN is the use of Wasserstein distance to measure the similarity between two high dimensional joint distributions, which solves the limitation in the original GAN framework where the training of the generator and the discriminator is unstable. Therefore ADS-GAN may be selected, and adapted by adding a contrastive term to its loss function to generate the patient variables in the study.

The patient feature space is denoted by X. Let X be a d-dimensional random variable in X, subject to distribution $P_X$. d-dimensional vector x is used to denote a generic realization of X, which is independently and randomly drawn from $P_X$, where integer d>1. The original dataset obtained in Section 2.2.1 is where $$D = \{x_i\}_{i=1}^{N},$$

where $$x_i = (x_i^{(1)}, x_i^{(2)}, \ldots, x_i^{(d)})$$

with $$x_i^{(j)}, \in X^{(j)} \subseteq R$$

representing the j-th feature of patient i. Here integer N is the number of samples and d is the number of features of each sample.

The goal of ADS-GAN is to produce a synthetic data set $\hat{D} = \{\hat{x}_i\}$ where each $\hat{x} \in \mathbb{R}^d$ is drawn from the distribution $P_{\hat{X}}$. Let Z be a random variable in space $\mathcal{Z}$, and z~$P_Z$ be the realizations of Z drawn from a multi-variate Gaussian distribution. G generator, e.g. generator network 206, G: X×Z→X and a discriminator, e.g. discriminator network 208, D: X→$\mathbb{R}$ are trained in an adversarial fashion: the generator G which produces synthetic patients $\hat{x}_i = G(x_i, z)$ ensures that the synthetic dataset $\hat{D} = \{\hat{x}_i\}$ is not too close to $D$ as measured by the $\epsilon$-identifiability defined below; on the other hand, the discriminator D which measures the distance between two distributions ensures that the distribution of generated patients $P_{\hat{X}}$ is indistinguishable from the distribution of real patients $P_X$.

Definition 1. The weighted Euclidean distance $U(x_i, x_j)$ between $x_i$ and $x_j$ is defined as $$U(x_i, x_j) = \|w(x_i - x_j)\|,$$

where w=$(\omega^{(1)}, \omega^{(2)} \ldots, \omega^{(d)})$ is a d-dimensional weight vector.

To calculate $\omega^k$ where 1<=k<=d, the discrete entropy of the k-th feature is first calculated, i.e.

$$H(X^{(k)}) = - \sum_{x^{(k)} \in X^{(k)}} P(X^k = x^k) \log[P(X^k = x^k)]$$

The weight $\omega^k$ is then calculated as the inverse of $H(X^{(k)})$. Since the theoretical For range of entropy for a feature is [0, log(N)], the theoretical range for $$\omega^k \text{ is } \left[\frac{1}{\log(N)}, \infty\right).$$

For the dataset, most feature weights are in range [0.25, 50]. In reality, if a patient can be re-identified, the re-identification is most likely through rare characteristics or medical conditions of a patient. Calculating the weight this way ensures that the rare features of a patient are given more weight, correctly reflecting the risk of re-identification associated with different features.

$r_i$ is defined as $$r_i = \min_{x_j \in \mathcal{D}/x_i} U(x_i, x_j),$$

where $\mathcal{D}/x_i$ represents the dataset $\mathcal{D}$ without $x_i$. From the definition, $r_i$ is the distance between $x_i$ and any other observation in $\mathcal{D}$ such that it is minimized. Similarly $\hat{r}_i$ is defined as $$\hat{r}_i = \min_{\hat{x}_j \in \hat{\mathcal{D}}} U(x_i, \hat{x}_j).$$

Definition 2. The $\epsilon$-identifiability of dataset $\mathcal{D}$ from $\hat{\mathcal{D}}$ is defined as $$\epsilon = I(\mathcal{D}, \hat{\mathcal{D}}) = \frac{1}{N}\sum_i [\prod(r_i > \hat{r}_i)], \quad (1)$$

where $\Pi$ is an indicator function.

The discriminator D is based on Wasserstein GAN with gradient penalty (WGANGP), which adopts Wasserstein distance between $P_{\hat{X}}$ and $P_x$, and defines the loss $\mathcal{L}_D$ for the discriminator D as $$\mathcal{L}_D = \mathbb{E}_{x \sim P_x, \hat{x} \sim P_{\hat{X}}}[D(\hat{x}) - D(\hat{x}) - \mu(\|\nabla_{\tilde{x}} D(\tilde{x})\|_2 - 1)^2] \quad (2)$$

where $\tilde{x}$ belongs to a random interpolation distribution between $P_x$ and $P_{\hat{X}}$ and $\mu$ is a hyper-parameter that is set to a value of 10. Both the generator and the discriminator may be implemented using multi-layer perceptrons. To train the generator G, the $\epsilon$-identifiability is computed by computing $r_i$ and $\hat{r}_i$ for every sample, which is computationally expensive. To solve the problem, Yoon et al. (2020) made a simplifying assumption that G (x, z) is the closest data point to x. However, this assumption can be violated during the training of the network that maximizes the distance between G (x, z) and x. A contrastive loss (triplet ranking loss) term is introduced, which is defined as $$U_{con}(x, x', z) = \max(0, U(x, G(x, z)) - U(x', G(x, Z))) \quad (3)$$

Then, the final identifiability loss function is $\mathcal{L}_I$ $$\mathcal{L}_J = \mathbb{E}_{x \sim P_X, z \sim P_z}[-U(x, G(x, z))] + \beta \mathbb{E}_{x, x' \sim P_x}[U_{con}(x, x', z)] \quad (4)$$

This loss function also assumes that G (x, z) is the closest data point to x. However, a penalty will be imposed if this assumption is violated when the generated sample G (x, z) is closer to x', a randomly drawn sample from dataset $\mathcal{D}$, than to x. The strength of the penalty term is controlled by $\beta$. In the final optimization problem, G is minimized, D is maximized, simultaneously, written as $$G^*, D^* = \arg\min_G \max_D [\mathcal{L}_D + \lambda L_I] \quad (5)$$

where $\lambda$ is a hyper-parameter that controls the trade-off between the two objectives. Once trained, the adapted ADS-GAN model can be used to produce synthetic data set Step 3: Data Generation Model and Captured Causal Effects A data generation model may be used to produce the potential outcomes for the synthetic data, i.e, the factuals and counterfactuals. Since the synthetic data may be used to evaluate causal inference models, the ground truth of the causal effects needs to be known. Therefore, a causal mechanism may be explicitly built into the data generation process to ensure that the causal effects are indeed what cause the potential outcomes and can therefore serve as the ground truth to evaluate causal inference models. Although a completely predictive model can be used to produce the potential outcomes, it does not make the causal effects known and may not be used in such a data generation process. Many researchers used arbitrary data generation functions and arbitrary treatment effects to produce such synthetic data. For example, a linear function may be used as the data generation process and set the treatment effects arbitrarily. Such approaches are simple, but cannot produce synthetic outcomes that resemble real outcomes. In this systems and methods of the present disclosure discussed herein, a neural network model is trained on the original dataset to capture both the treatment effects with the network weights and the mapping from patient covariates to outcomes. the learned mapping and treatment effects may be used, along with the synthetic covariates as the network's inputs, to produce synthetic outcomes that resemble real outcomes. The captured treatment effects may serve as the ground truth in the synthetic data when the data is used to evaluate causal inference models because the patient outcomes are generated from these causal effects.

It should be understood that there is a distinction between the ground truth in the context of causal model evaluation and the true treatment effects in the real world. In the discussion of the present disclosure, the captured effects are the ground truth in the synthetic data, but not necessarily the accurate true treatment effects of the treatments in the real world.

The domain of observed patient variable X of d dimensions is partitioned into the covariate domain $X_C \subseteq \mathbb{R}^{d_c}$ the treatment domain $X_T \subseteq \mathbb{R}^{d_t}$ and the outcome domain $X_O \subseteq \mathbb{R}$, so that $d \geq d_c + d_t + 1$. The covariates are all the patient variables excluding drugs, prior drugs, zip code, and lab+. Treatments are the drugs. Outcome is the difference between lab+ and lab−. Each treatment $t_i \in X_T$ is one-hot encoded and represented by a $d_t$ dimensional vector, where $d_t$ is the number of treatments. In a cohort of N patients, for the i-th individual patient $Y_i$ is used, which is a scalar, to denote the potential outcome under treatment $t_i \in X_T$, and $x_{ci}$ to denote the covariates of this patient. It is assumed that $(Y_i, t_i, x_{ci}) \in \mathbb{R} \times X_T \times X_C$ are independently and identically distributed, which means that the potential outcomes for a patient are not impacted by the treatment status of other patients. It is further assumed that all the confounders are included in xc, and each patient has a none-zero chance of receiving any treatment. Therefore, the three fundamental assumptions for causal inference, SUTVA, unconfoundedness, and positivity, are satisfied.

Furthermore, given $x_{ci} \in X_C$ and $t_i, t_0 \in X_T$, where $t_0$ is the zero-vector placebo, the individual-level treatment effect (ITE) of $t_i$ can be defined as $$\tau_{ti}(X_{ci}) := \mathbb{E}[Y(t_i) - Y(t_0)|x_{ci}]. \quad (6)$$

Hence, the population average treatment effect for treatment ti can be defined as $$ATE_{ti} := \mathbb{E}[Y(t_i) - Y(t_0)] = \int X_c \tau_{ti}(x_c) p(x_c) dx_c. \quad (7)$$

The data generation process can be modeled as $Y=\Omega(x_c,t)$, where $\Omega: X_C \times X_T \to X_0$. The true form of $\Omega$ is unknown and can be complicated. Here a simplifying assumption is made, that the representation learned from the covariate domain is separated from the representation learned from the treatment domain. Specifically, let $\Phi: X_C \to \mathcal{R}$ be a representation function and $\mathcal{R}$ be the representation space. Q is defined as $Q: \mathcal{R} \times X_T \to X_0$ so that $\Omega(x_c,t)=Q(\Phi(x_c),t)$.

With simplified $\Omega$, a neural network architecture may be used, such as, for example, the neural network architecture shown in FIG. 3, that is able to capture $\Omega$, $\Phi$, and at the same time, calculate the treatment effects. For the covariate domain $X_C$, the network is a fully connected feed-forward neural network with Relu as the activation function for all the neurons. For the treatment domain $X_T$, the inputs are encoded treatments directly connected to a neuron with a linear activation. The loss function is the standard mean square error (MSE). A dropout is applied to all the layers and L2 regularization is applied to all the weights of the neural network.

The model $\Omega$ is trained on the original dataset described in section 2.2.1, where one factual is present for each observation. Due to the separation of the covariate domain and treatment domain, and with the particular architecture of the ANN shown in FIG. 3, the neural network weights for treatment connections can be interpreted as the causal treatment effects. Since there is no interaction between the covariates and treatments, the individual treatment effects and population average treatment effects are the same. Indeed, suppose w is the weight vector for treatment input t, then $$Y(t_i | x_{ci}) = \Phi(x_{ci}) + w t_i^T + e_i$$

where $\Phi(x_{ci})$ is the contribution to the neural network output from the covariate domain, $w t_i^T$ is the contribution from the treatment domain, and $e_i$ is the error term. The outcome for the placebo to becomes, $$Y(t_0 | x_{ci}) = \Phi(x_{ci}) + w t_0^T + e_i$$

According to Equation 6, the treatment effect is then $$\tau t_i = w(t_i^T - t_0^T) = w t_i^T$$

Since $t_i$ is a one-hot encoded vector, the treatment effect $\tau t_i$ is just the weight of the neural network connection to the treatment given to this patient. One can similarly show that the weight is also the $ATE_{ti}$ in Equation 7.

Step 4: Generation of Factuals and Counterfactuals

The domain of variables and all its partitions are the same for the real dataset D as for the synthetic dataset $$\hat{D} = \{\hat{x}i:\hat{x}i = G(x_i, z), x_i \in \mathcal{D}, z \sim P_Z\}_i^N = 1.$$

Hence, the neural network trained on the original dataset in Step 2.2.3 can be fed with the synthetic patient variables generated in Step 2.2.2. The neural network outputs are served as the treatment outcomes for the synthetic data.

Once trained, the neural network may be capable of generating all factual and counterfactual treatment outcomes for the synthetic data. For any synthetic patient with covariate $x_{cj} \in X_c$, the potential outcome of any treatment $t_i \in X_C$ can be generated as $\hat{Y}j(t_i) = \Omega(\hat{x}cj, t_i) = Q(\Phi(\hat{x}cj), t_i)$. However, instead of generating the potential outcomes of all possible treatments in $X_T$, in this work only two potential outcomes are generated for each patient: the factual outcome corresponding to the treatment produced by the ADS-GAN model, and the counterfactual outcome if the patient had not received any treatment. Note that only one treatment may be produced above for each synthetic patient with the ADS-GAN model, in order to preserve the treatment assignment mechanism learned from the original dataset, where each patient received only one treatment.

There is a distinction between the assumptions made in Section 2.2.3 in determining the treatment effects and the assumptions that the synthetic dataset actually satisfies. Specifically, the synthetic dataset satisfies the SUTVA and unconfoundedness assumption, as the interactions between patients may not be modeled and all the patient variables in the dataset used to generate the outcomes may be provided. Whether the synthetic dataset satisfies the positivity assumption, however, depends on the original dataset because the patient assignment mechanism for the synthetic data is learned from the original dataset. The validity of this assumption can be checked by calculating the patients' propensity scores. Violation of this assumption poses challenges to models that estimate causal effects based on propensity scores, such as the one proposed in.

Evaluations

To evaluate the quality of the synthetic dataset, the joint data distributions can be compared between the original and synthetic datasets. First the Wasserstein distance between the joint distribution of the synthetic data and that of the original data is calculated. The Wasserstein distance between two distributions ranges in $[0, \infty]$ and can be interpreted as the optimal cost of transforming one distribution to the other. To put the calculated value in correct perspective, the Wasserstein distance between the original dataset and a randomly generated dataset of the same dimensions may be measured. This serves as the baseline scenario. In addition, the original dataset may be randomly split into two datasets and the Wasserstein distance between them may be measured, which is essentially the Wasserstein distance between the dataset and itself and serves as the best-case scenario. The joint distributions may also be visually compared by plotting the heatmap of the two joint distributions side by side, and compared the marginal distributions of individual variables of the generated synthetic data with the corresponding ones from the original data.

Since the synthetic dataset generated in this study is meant to be made public, patient privacy has to be preserved to ensure that no actual patients in the original dataset can be identified through the synthetic dataset. The e-identifiability, as defined in Definition 2, may be calculated to evaluate whether patient privacy is addressed. The e-identifiability for the original data, from a randomly generated dataset, may also be calculated, which should be zero in theory but can be a small positive number due to a non-zero possibility of identifying a real patient from unrelated data. It serves as a reference of how small the e-identifiability can possibly be. The correlation matrix between the synthetic and original datasets may then be calculated, to see how each variable of the synthetic data is correlated with every variable of the original data.

Finally, to demonstrate the usage of the dataset, the accuracy of the causal effect estimate may be evaluated using the data with four well established models: the doubly robust (DR), the propensity score stratification, the propensity matching, and the inverse probability treatment weighting (IPTW) model. Doubly robust approaches adopt an outcome regression model to estimate the treatment outcome and a propensity model to estimate the probability of a patient being assigned to a treatment. In the DR model, random forest is used as the outcome regression model. Microsoft DoWhy and EconML causal inference packages may be used for the implementation. When calculating the causal effect of a treatment, all the counter-factuals may be removed from the dataset to prevent the problem from becoming trivial.

Four metrics may be adopted to evaluate the models: the Spearman's rank correlation coefficient to measure how well the models preserve the rank of the drugs by their treatment effects, the Kendall rank coefficient similar to Spearman's coefficient but based on concordant and discordant pairs, the Pearson correlation coefficient between the estimated effects and the ground truth, and finally the magnitude metric R-square ($\mathcal{R}^2$), measuring how much variance of the ground truth can be explained by the estimate. A comparison of the first three correlation metrics, and a discussion of $\mathcal{R}^2$ can be found in various literature known in the art.

To estimate how these models perform in a real-world setting, an additional dataset may be generated consisting of all patient variables of the original dataset and patient outcomes generated from the trained outcome neural network with patient variables and treatments from the original dataset as its inputs. This dataset may be referred to as the hybrid dataset because part of the data comes from the original dataset and part of the data is generated. The four causal inference models may be run on both the synthetic dataset and the hybrid dataset and compared the results.

Results

This section reports the quality of the synthetic dataset. Strong similarity may be found in both marginal and joint data distributions between the original and synthetic dataset, and that patient privacy is preserved.

Data Similarity and Patient Identifiability

How well the generated synthetic data preserves the joint distribution of the original data may be shown. The Wasserstein distance between the joint distribution of the synthetic data and that of the original data may be calculated to be 0.35, which is in the range (0.17, 8.6), where 0.17 is the Wasserstein distance in the best case scenario and 8.6 is the Wasserstein distance in the baseline scenario. Multiple random splits may be tried in the best case scenario and it may be determined that the Wasserstein distance varies very little with different splits.

Figure 4A:
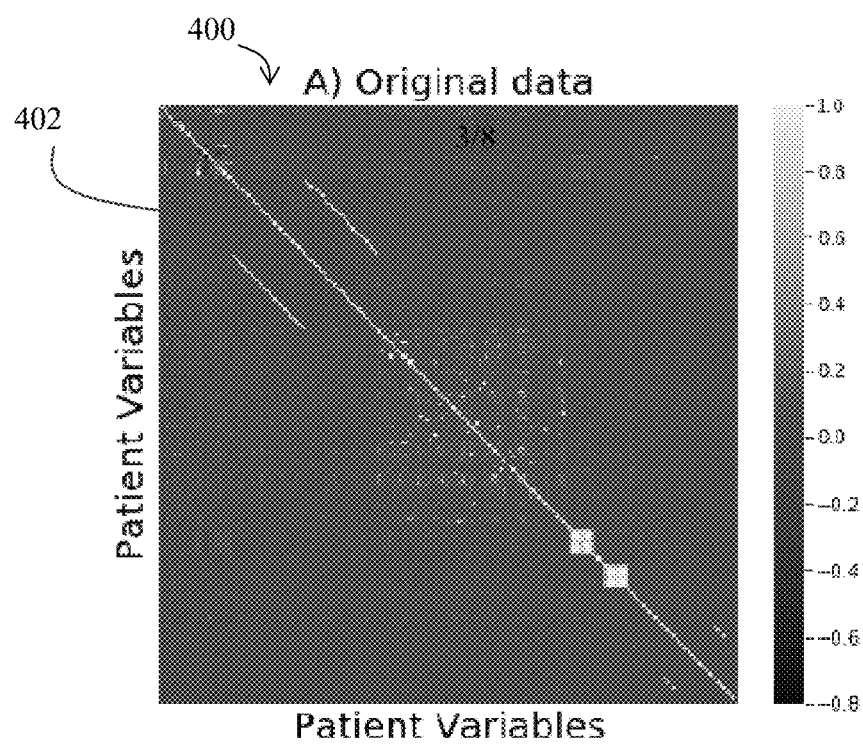
FIGS. 4A-4C are heatmaps of correlation matrices of patient variables for the original, synthetic, and between original and synthetic data respectively in accordance with embodiments of the present disclosure.
Figure 4B:
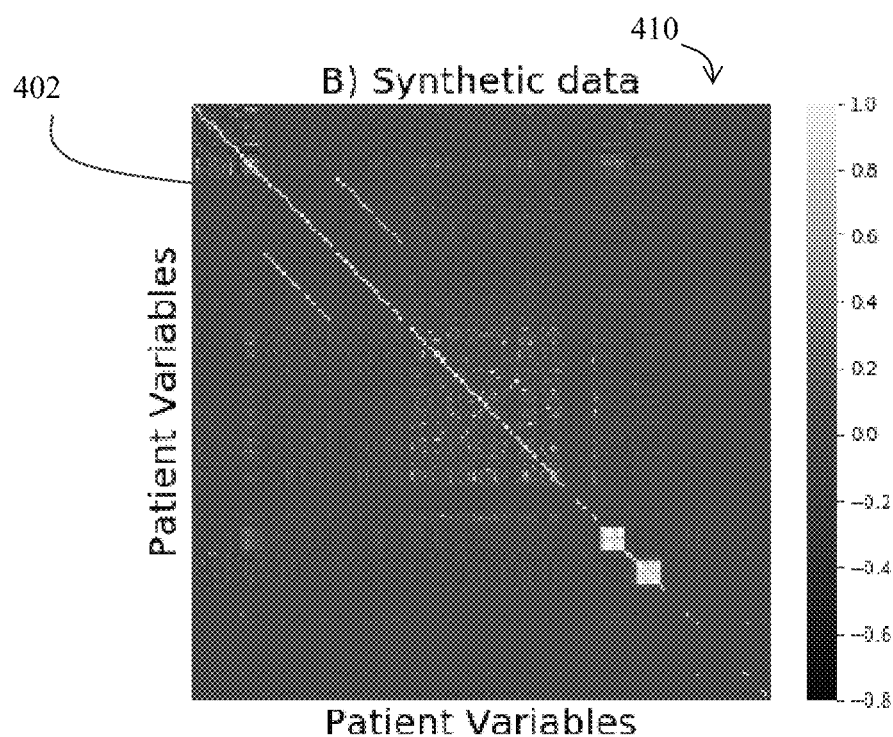
Figure 5:
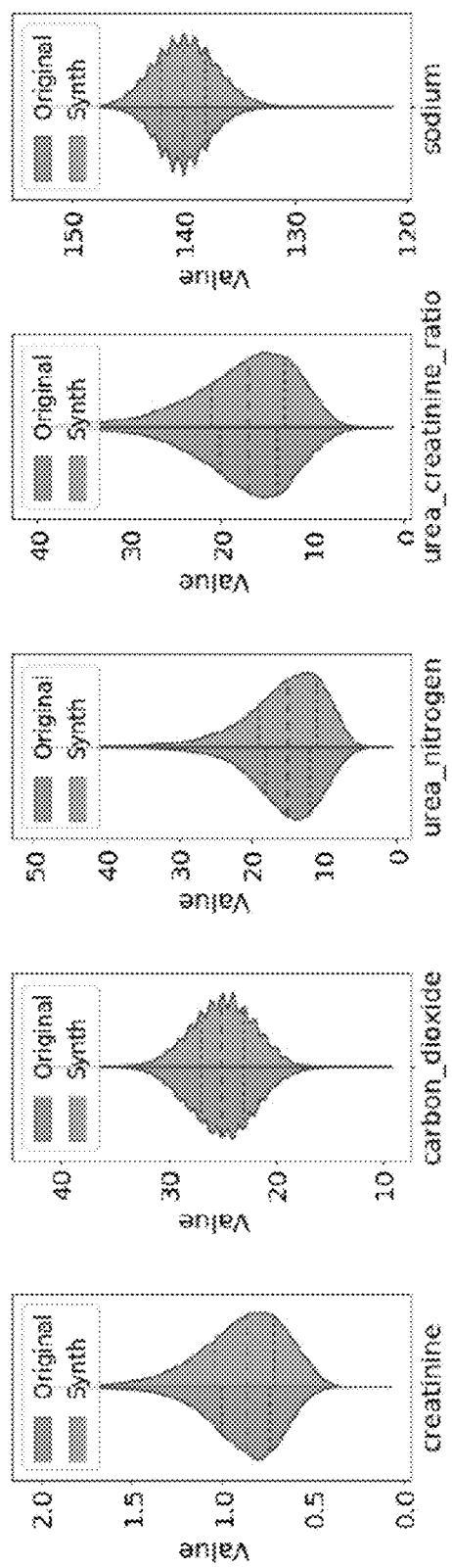
FIG. 5 is a comparison of marginal distribution of lab values between original and synthetic data in accordance with embodiments of the present disclosure. The three horizontal dotted lines in each violin plot from top to the bottom represent the third quartile, median, and the first quartile respectively.

The joint distributions may also be compared visually. The correlation among all patient attributes in the original dataset is visualized by heatmap 400 in FIG. 4A. The correlation among all patient attributes in the synthetic dataset is visualized by heatmap 410 in FIG. 4B. In each heatmap, the brighter the color of a pixel is, the more correlated the two variables are with each other. The diagonal is the brightest in the map, as each pixel on the diagonal 402 represents the correlation between a variable and itself. The two heatmaps show almost identical patterns, indicating the joint distribution of the original data is well preserved in the synthetic data. In FIG. 5, marginal distributions of individual variables of the generated synthetic data (orange—to the right) may be compared qualitatively with the related ones from the original data (blue—to the left). FIG. 5 shows strong similarity between the original and synthetic dataset in both basic statistical summaries (e.g., median and quartiles) and overall shape of these distributions.

Figure 4C:
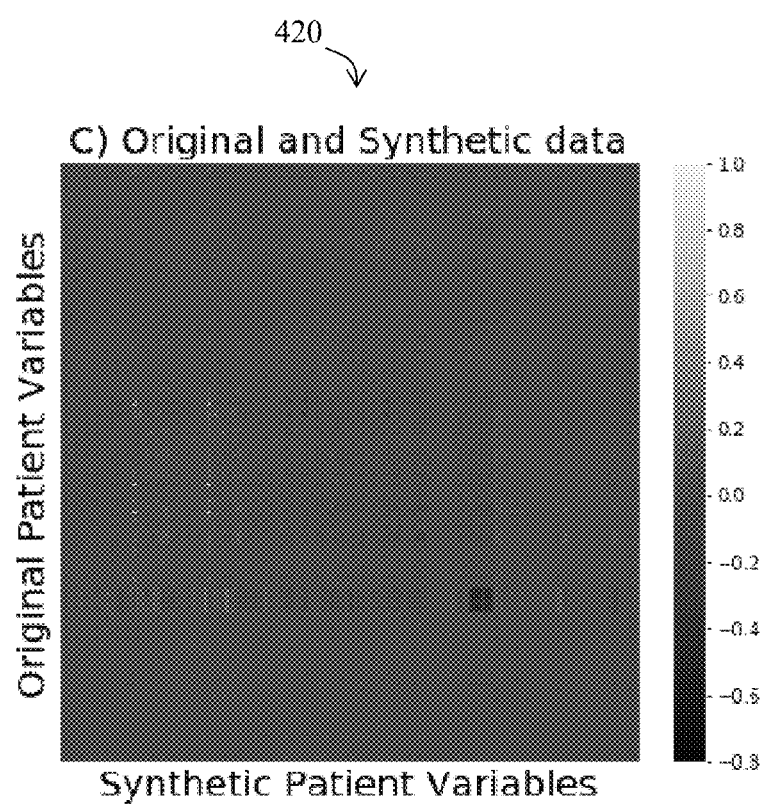

As far as patient privacy is concerned, all the synthetic samples in the dataset are conceptually drawn from a distribution, so no single piece of information about any actual patients is directly carried over to the dataset. The e-identifiability may be calculated as defined in Definition 2 to be 0.008% from the synthetic dataset, and 0.0007% from the random dataset, indicating that the risk of any actual patient being identified from the synthetic dataset is extremely small. FIG. 4C shows that the correlation between the variables of the original data and those of the synthetic data is very low, consistent with the small e-identifiability value reported above.

Evaluate Causal Inference Algorithms Using the Dataset

The four causal inference models may be run, as described above, on both the hybrid and the synthetic datasets and report all the results in Table 2 and 3.

TABLE 2

Model evaluation results on hybrid dataset.

| | Spearman | Kendalltau | Correlation | R2 score |
|---|---|---|---|---|
| Doubly Robust—RF | 1.00 | 1.00 | 1.00 | 0.76 |
| Propensity Stratification | 0.96 | 0.91 | 0.97 | −0.23 |
| Propensity Matching | 0.94 | 0.82 | 0.90 | −1.01 |
| IPW | −0.22 | −0.16 | −0.28 | −845.88 |

TABLE 3

Model evaluation results on synthetic dataset.

| | Spearman | Kendalltau | Correlation | R2 score |
|---|---|---|---|---|
| Doubly Robust—RF | 1.00 | 1.00 | 1.00 | 0.76 |
| Propensity Stratification | 0.96 | 0.91 | 0.97 | −0.23 |
| Propensity Matching | 0.94 | 0.82 | 0.90 | −1.01 |
| IPW | −0.22 | −0.16 | −0.28 | −845.88 |

The sample results on the hybrid dataset (Table 2) show that the evaluated algorithms performed very differently: the doubly robust model produced the best results and captured both the ranking and the magnitude of the drug effects; the propensity stratification and matching model captured the ranking of the drugs, but may not be able to correctly calculate the magnitude of the drug effects. The IPTW model may not be able to produce correct results on the ranking, nor on the magnitude, which may not be surprising due to its significant bias if the propensity model is misspecified. The results on the synthetic dataset (Table 3) show a similar pattern. The doubly robust model performed the best, followed by propensity stratification and matching. IPTW performed the worst. Investigating why some models outperform others on the two datasets is out of scope of this work. Here it is shown that the synthetic data preserves the relative performance of different models that would be achieved in a more realistic setting, represented by the hybrid dataset.

The size of the synthetic data is reduced and it may be observed how the model evaluation results changes with smaller data sizes. For example, when the size is reduced to a percentage (e.g., 20%) of the original size, the results may still be similar to those obtained with the full dataset. When the size is below the percentage (e.g., below 20%), however, the standard deviation of the results may start to increase significantly.

Figure 6B:
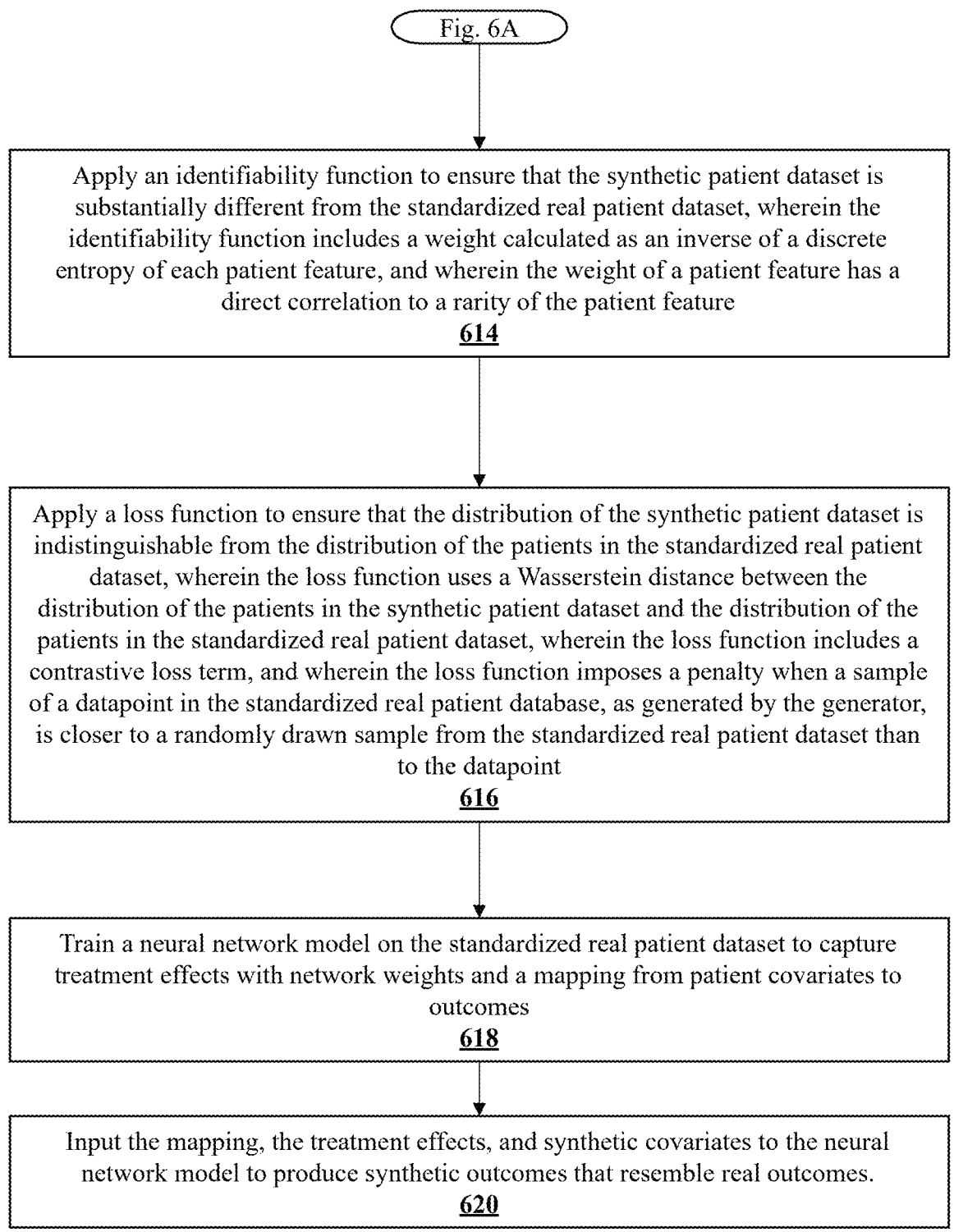

Turning now to FIGS. 6A and 6B, where a flow chart of a method 600 of generating a synthetic patient dataset for use in causal effect evaluation of a treatment for a condition, from a real patient dataset comprising data relating to real patients who have been diagnosed with the condition, in accordance with one aspect of the precent disclosure is shown. The method comprises the steps of creating (602) a filtered real patient dataset by removing, from the real patient dataset, data relating to patients having at least one of a disqualifying demographic condition, a disqualifying medical condition, and a disqualifying treatment, and filtering (604) the real patient dataset to include only patients having received one of a plurality of identified treatments for the condition. The method further comprises the steps of creating (606) a standardized real patient dataset by capturing trajectory data representing the filtered real patient dataset, converting (608) the trajectory data to tabular data, the tabular data comprising samples relating to patients, and variables relating to patient features, and standardizing (610) the variables into numerical values.

The method further comprises generating (612) the synthetic patient dataset, using a generator, by creating a cartesian product of a patient feature space of the standardized real patient dataset, and a random variable space, and mapping the cartesian product to the patient feature space, measuring (614) a distance between a distribution of the synthetic patient dataset and a distribution of the patients in the standardized real patient dataset, using a discriminator, by mapping the patient feature space to a set of real numbers, wherein the generator and the discriminator are trained in an adversarial fashion.

The method further comprises applying (616) an identifiability function to ensure that the synthetic patient dataset is substantially different from the standardized real patient dataset, wherein the identifiability function includes a weight calculated as an inverse of a discrete entropy of each patient feature, and wherein the weight of a patient feature has a direct correlation to a rarity of the patient feature.

The method further comprises applying (618) a loss function to ensure that the distribution of the synthetic patient dataset is indistinguishable from the distribution of the patients in the standardized real patient dataset, wherein the loss function uses a Wasserstein distance between the distribution of the patients in the synthetic patient dataset and the distribution of the patients in the standardized real patient dataset, wherein the loss function includes a contrastive loss term, and wherein the loss function imposes a penalty when a sample of a datapoint in the standardized real patient database, as generated by the generator, is closer to a randomly drawn sample from the standardized real patient dataset than to the datapoint.

The method further comprises training (620) a neural network model on the standardized real patient dataset to capture treatment effects with network weights and a mapping from patient covariates to outcomes, and inputting (622) the mapping, the treatment effects, and synthetic covariates to the neural network model to produce synthetic outcomes that resemble real outcomes.

In some embodiments, each patient in the synthetic data set is associated with a treatment received by the patient. In some embodiments, the method may also include the steps of feeding the synthetic data set into the neural network; and using the neural network, generating, for each patient in the synthetic data set, a factual treatment outcome relating to the treatment, and a counterfactual treatment outcome representing an outcome of not having received the treatment.

In some embodiments, the variables relate to measured vital statistics, treatments, basic patient information, laboratory measurements, and patient conditions. In some embodiments, a variable relating to treatments includes a date of treatment, wherein a variable relating to vital statistics includes a date of measurement, and wherein the dataset includes at least one vital statistic measured before the date of treatment, and at least one vital statistic measured after the date of treatment. In some embodiments, a variable relating to treatments includes a date of treatment, a variable relating to laboratory measurement includes a date of measurement, and the dataset includes at least one laboratory measurement measured before the date of treatment, and at least one laboratory measurement measured after the date of treatment.

In some embodiments, standardizing the variables into numerical values may also include transforming the variables into numerical values in the [0,1] range. In some embodiments, the synthetic outcomes include counterfactual outcomes resulting from an absence of a treatment.

In the above description one dataset was produced for hypertension and four causal inference models were evaluated. However, persons having skill in the art may used the disclosure herein to produce and evaluate synthetic datasets for other diseases, and/or to compare other causal inference models. Because hypertension affects almost half of adults in the United States, a synthetic dataset on hypertension is of significant value by itself. For simplicity, it may be assumed that the covariate domain is separated from the treatment domain. Treatment modifiers, i.e, interactions between treatments and patient variables, may also be considered when producing treatment effects and/or modeled.

The present disclosure is related to several existing works on publicly available databases, fictitious patient record creations, and data generation processes. The Infant Health and Development Program (IHDP) is a randomized controlled study designed to evaluate the effect of home visits from specialist doctors on the cognitive test scores of premature infants. The Jobs dataset, known to those in the art, is a benchmark used by the causal inference community, where the treatment is job training and the outcomes are income and employment status after training. The Twins dataset, used for evaluating causal inference, consists of samples from twin births in the U.S. between the years 1989 and 1991. The Annual Atlantic Causal Inference Conference (ACIC) data challenge provides an opportunity to compare causal inference methodologies across a variety of data generation processes. In the present disclosure a data generation process from real-world patient data using a neural network is disclosed and used the learned network to generate patient outcomes.

Some previous attempts at generating synthetic EHRs included generating synthetic EHRs based on publicly available information. The focus of these works was on generating the life cycle of a patient and how a disease evolves over time. In some previous works, the following were evaluated: three synthetic data generation models—probabilistic models, classification-based imputation models, and generative adversarial neural networks—in generating realistic EHR data. In some previous works, a Bayesian network model was used to generate synthetic data based on the Clinical Practice Research Datalink (CPRD) in the UK. In some previous works, synthetic data produced from 5 contemporary studies was evaluated using MDClone. In some previous works, a framework to generate and evaluate synthetic health care data was proposed, and the key requirements of synthetic data for multiple purposes. In some previous works, synthetic participants were generated that resemble participants of the Systolic Blood Pressure Trial (SPRINT) trial. All of these previous works, however, focus on data generation producing patient variables but without ground truth for causal effects. In contrast, the focus of the work was not only on generating patient variables, but on producing ground truth for causal effects as well.

To validate their models, many researchers created synthetic covariates and produced potential outcomes with a designed data generation process. Such datasets were not designed to approximate any real data distributions. For example, in previous attempts a statistical framework for replicating the electronic healthcare claims data from an empirical cohort study and preserving the associations among patient variables was created. In other previous attempts, a benchmark for causal estimators was provided by focusing on the simplest setting with no confounding, no selection bias, and no measurement error. All these works generated potential outcomes from covariates with known causal effects, but without any regard to patient privacy. The critical issue of patient privacy concerns have bene addressed in the present disclosure, so that the data can be made available for the research community to evaluate their models.

Some oversampling techniques such as the Synthetic Minority Oversampling Technique (SMOTE) can be used to generate synthetic patients from real patients. These techniques do not explicitly address the patient privacy issue. Indeed, SMOTE was implemented, and synthetic data was generated with it. The e-identifiability of the synthetic data generated this way was calculated to be 0.4%, much larger than the value 0.008% with the approach of the present disclosure.

In summary, researchers have traditionally relied on labeled data, i.e. ground truth to validate machine learning models. Due to the fundamental problem of causal inference, however, the lack of realistic clinical data with ground truth makes it difficult to evaluate causal inference models. In the present disclosure, a large-scale and realistic synthetic dataset was produced by adapting an ADS-GAN model to generate patient variables and using a neural network to produce patient outcomes. The data generated supports multiple treatments with known treatment effects. It has been demonstrated that this synthetic dataset preserves patient privacy and has strong similarity to the original dataset it is modeled after. It will facilitate the evaluation, understanding and improvement of causal inference models, especially with respect to how they perform in real-world scenarios.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A method of generating a synthetic patient dataset for use in causal effect evaluation of a treatment for a condition, from a real patient dataset comprising data relating to real patients who have been diagnosed with the condition, the method comprising the steps of:
   creating a filtered real patient dataset by
      removing, from the real patient dataset, data relating to patients having at least one of a disqualifying demographic condition, a disqualifying medical condition, and a disqualifying treatment; and
      filtering the real patient dataset to include only patients having received one of a plurality of identified treatments for the condition;
   creating a standardized real patient dataset by capturing trajectory data representing the filtered real patient dataset;
      converting the trajectory data to tabular data, the tabular data comprising samples relating to patients, and variables relating to patient features; and
      standardizing the variables into numerical values;
   generating the synthetic patient dataset, using a generator neural network of a generative adversarial network, by creating a cartesian product of a patient feature space of the standardized real patient dataset, and a random variable space, and mapping the cartesian product to the patient feature space;
   measuring a distance between a distribution of the patients in the synthetic patient dataset and a distribution of the patients in the standardized real patient dataset, using a discriminator neural network of the generative adversarial network, by mapping the patient feature space to a set of real numbers, wherein the generator neural network and the discriminator neural network are trained in an adversarial fashion that includes iteratively using the standardized real patient dataset and a synthetic dataset generated by the generator neural network to train the discriminator neural network and using outputs from the discriminator neural network to train the generator neural network so that the generator neural network generates revised synthetic dataset subsequent to receiving outputs from the discriminator neural network and a combination of the standardized real patient dataset and the revised synthetic dataset is used for training the discriminator neural network;
   applying, by the generator neural network of the generative adversarial network, an identifiability function on the standardized real patient dataset and the synthetic patient dataset to ensure that the synthetic patient dataset is substantially different from the standardized real patient dataset, wherein the identifiability function includes a weight calculated as an inverse of a discrete entropy of each patient feature, and wherein the weight of a patient feature has a direct correlation to a rarity of the patient feature;
   applying, by the discriminator neural network of the generative adversarial network, a loss function to ensure that the distribution of the patients in the synthetic patient dataset is indistinguishable from the distribution of the patients in the standardized real patient dataset, wherein the loss function uses a Wasserstein distance between the distribution of the patients in the synthetic patient dataset and the distribution of the patients in the standardized real patient dataset, wherein the loss function includes a contrastive loss term, and wherein the loss function imposes a penalty when a datapoint in the synthetic patient dataset, as generated by the generator neural network, is closer to a randomly drawn sample from the standardized real patient dataset than to a datapoint in the standardized real patient dataset corresponding to the datapoint in the synthetic patient dataset;

training a neural network model on the standardized real patient dataset to capture treatment effects with network weights and a mapping from patient covariates to outcomes selected from the standardized real patient dataset; and inputting the mapping, the treatment effects, and synthetic covariates selected from the synthetic patient dataset to the neural network model to produce synthetic outcomes that resemble real outcomes.

2. The method of claim 1, wherein each patient in the synthetic patient dataset is associated with a treatment received by the patient, the method further comprising the steps of feeding the synthetic patient dataset into the neural network model; and using the neural network model, generating, for each patient in the synthetic patient dataset, a factual treatment outcome relating to the treatment, and a counterfactual treatment outcome representing an outcome of not having received the treatment.

3. The method of claim 1, wherein the variables relate to measured vital statistics, treatments, basic patient information, laboratory measurements, and patient conditions.

4. The method of claim 3, wherein a variable relating to treatments includes a date of treatment, wherein a variable relating to vital statistics includes a date of measurement, and wherein the dataset includes at least one vital statistic measured before the date of treatment, and at least one vital statistic measured after the date of treatment.

5. The method of claim 3, wherein a variable relating to treatments includes a date of treatment, wherein a variable relating to laboratory measurement includes a date of measurement, and wherein the dataset includes at least one laboratory measurement measured before the date of treatment, and at least one laboratory measurement measured after the date of treatment.

6. The method of claim 1, wherein standardizing the variables into numerical values further comprises transforming the variables into numerical values in the [0,1] range.

7. The method of claim 1, wherein the synthetic outcomes include counterfactual outcomes resulting from an absence of a treatment.

8. A computer system for generating a synthetic patient dataset for use in causal effect evaluation of a treatment for a condition, from a real patient dataset comprising data relating to real patients who have been diagnosed with the condition, the computer system comprising:

one or more processors; and memory storing one or more programs for execution by the one or more processors, the one or more programs including instructions for:

creating a filtered real patient dataset by
removing, from the real patient dataset, data relating to patients having at least one of a disqualifying demographic condition, a disqualifying medical condition, and a disqualifying treatment; and
filtering the real patient dataset to include only patients having received one of a plurality of identified treatments for the condition;

creating a standardized real patient dataset by
capturing trajectory data representing the filtered real patient dataset;
converting the trajectory data to tabular data, the tabular data comprising samples relating to patients, and variables relating to patient features; and
standardizing the variables into numerical values;

generating the synthetic patient dataset, using a generator neural network of a generative adversarial network, by creating a cartesian product of a patient feature space of the standardized real patient dataset, and a random variable space, and mapping the cartesian product to the patient feature space;

measuring a distance between a distribution of the patients in the synthetic patient dataset and a distribution of the patients in the standardized real patient dataset, using a discriminator neural network of the generative adversarial network, by mapping the patient feature space to a set of real numbers, wherein the generator neural network and the discriminator neural network are trained in an adversarial fashion that includes iteratively using the standardized real patient dataset and a synthetic dataset generated by the generator neural network to train the discriminator neural network and using outputs from the discriminator neural network to train the generator neural network so that the generator neural network generates revised synthetic dataset subsequent to receiving outputs from the discriminator neural network and a combination of the standardized real patient dataset and the revised synthetic dataset is used for training the discriminator neural network;

applying, by the generator neural network of the generative adversarial network, an identifiability function on the standardized real patient dataset and the synthetic patient dataset to ensure that the synthetic patient dataset is substantially different from the standardized real patient dataset, wherein the identifiability function includes a weight calculated as an inverse of a discrete entropy of each patient feature, and wherein the weight of a patient feature has a direct correlation to a rarity of the patient feature;

applying, by the discriminator neural network of the generative adversarial network, a loss function to ensure that the distribution of the patients in the synthetic patient dataset is indistinguishable from the distribution of the patients in the standardized real patient dataset, wherein the loss function uses a Wasserstein distance between the distribution of the patients in the synthetic patient dataset and the distribution of the patients in the standardized real patient dataset, wherein the loss function includes a contrastive loss term, and wherein the loss function imposes a penalty when a datapoint in the synthetic patient dataset, as generated by the generator neural network, is closer to a randomly drawn sample from the standardized real patient dataset than to a datapoint in the standardized real patient dataset corresponding to the datapoint in the synthetic patient dataset;
training a neural network model on the standardized real patient dataset to capture treatment effects with network weights and a mapping from patient covariates to outcomes selected from the standardized real patient dataset; and
inputting the mapping, the treatment effects, and synthetic covariates selected from the synthetic patient dataset to the neural network model to produce synthetic outcomes that resemble real outcomes.

* * * * *